(No Model.)
G. SEITZ & W. B. McNULTY.
PULLEY COVERING.
No. 499,758. Patented June 20, 1893.
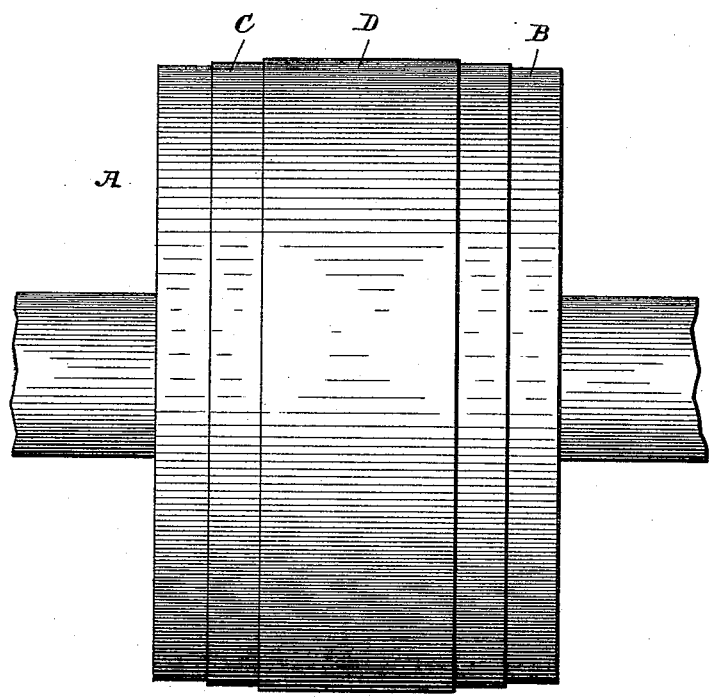
Witnesses
Harry L. Amer.
By their Attorneys,
Inventors
George Seitz and
William B. McNulty

UNITED STATES PATENT OFFICE.

GEORGE SEITZ AND WILLIAM B. McNULTY, OF HOBOKEN, NEW JERSEY; SAID SEITZ ASSIGNOR TO SAID McNULTY.

PULLEY-COVERING.

SPECIFICATION forming part of Letters Patent No. 499,758, dated June 20, 1893.

Application filed August 6, 1892. Serial No. 442,347. (No specimens.)

*To all whom it may concern:*

Be it known that we, GEORGE SEITZ and WILLIAM B. McNULTY, citizens of the United States, residing at Hoboken, in the county of Hudson and State of New Jersey, have invented a new and useful Improvement in Pulley-Coverings, of which the following is a specification.

Our invention relates to improvements in pulley coverings, the object of the same being to provide a covering for either iron or wood pulleys which may not become separated from the pulley, or the parts thereof become separated from each other, by the action of heat, steam, moisture, or severe strain.

Further objects of our invention will appear in the following description, the novel features thereof being pointed out in the appended claim.

In the drawing we have illustrated a pulley provided with a covering embodying our invention.

Straw-board is employed as the basis of the covering, and it is applied to the face of the pulley, which is shown at A, in the drawings, in three or more layers, B, C, D, the first layer, B, being equal in width to the face of the pulley the second layers, C, being slightly narrower than the first layer, so as to expose an equal width of said first layer upon opposite sides thereof, and the third layer being still narrower, so as to expose equal widths of the second layer upon opposite sides thereof, as shown in the drawing.

Preparatory to the application of the straw-board covering layers to the face of the pulley, said covering is saturated with a compound or mixture, containing: flour, five pounds; glue, (ground,) one pound; powdered borax, one-fourth ounce; powdered alum, one-fourth ounce; oil of cloves, ten drops, and juice of two large onions. To this is added sufficient water and the whole is boiled until thoroughly mixed and the mixture in a liquid state, after which, and just previous to the application thereto of the straw-board, a small quantity of litharge is added, the amount of the latter ranging from one-fourth ounce to one ounce according to the amount of moisture to which the pulley is to be exposed, (a greater quantity being needed as the degree of exposure to moisture is increased.) After saturating the straw-board in this mixture, and thoroughly coating each portion of the covering, it is applied to the pulley in layers, or sections, as above described, the first layer or section being equal in width to the face of the pulley, the next somewhat narrower, and so on.

From the above it will be seen that the cement or adhesive portion of the above compound comprises the flour, glue, borax, and alum, and to this cement is added the oil of cloves to prevent the cement from souring. The onion juice adds greatly to the adhesive properties of the cement, and thus causes the sections or parts of the straw-board covering to cohere more firmly, and also causes the covering to adhere more strongly to the pulley rim.

The litharge, which we use in connection with the cement, renders the covering more impervious to moisture, and thus prevents the same from acting upon the cement to loosen it and allow the covering to become detached.

Having thus described our invention, what we claim, and desire to secure by Letters Patent of the United States, is—

A pulley-covering saturated with a cement containing flour, glue, borax, alum, oil of cloves, juice of onions, and litharge.

In testimony that we claim the foregoing as our own we have hereto affixed our signatures in the presence of two witnesses.

GEORGE SEITZ.
WM. B. McNULTY.

Witnesses:
ELIAS R. PECK,
WM. H. CROWLEY.